US005215336A

United States Patent [19]

Worthing

[11] Patent Number: 5,215,336

[45] Date of Patent: Jun. 1, 1993

[54] COUPLING JOINT ASSEMBLY WITH INTEGRAL RETENTION MECHANISM

[75] Inventor: Albert L. Worthing, Tustin, Calif.

[73] Assignee: Shur-Lok Corporation, Irvine, Calif.

[21] Appl. No.: 723,381

[22] Filed: Jun. 28, 1991

[51] Int. Cl.[5] .............................................. F16L 35/00

[52] U.S. Cl. ........................................ 285/81; 285/87; 285/92; 285/319; 411/121; 411/280; 411/937

[58] Field of Search ....................... 285/81, 82, 87, 92, 285/319; 411/121, 280, 937, 937.1

[56] References Cited

U.S. PATENT DOCUMENTS

| | | | |
|---|---|---|---|
| 448,165 | 3/1891 | Robison | 285/81 X |
| 1,070,844 | 8/1913 | Roe | 285/87 X |
| 1,279,809 | 9/1918 | White et al. | 285/87 |
| 2,343,067 | 2/1944 | Luce | 411/937.1 X |
| 2,992,018 | 7/1961 | Rosán | 285/81 |
| 3,702,707 | 11/1972 | Rooan, Sr. | 285/92 X |
| 4,150,845 | 4/1979 | Riuli et al. | 285/81 |
| 4,152,039 | 5/1979 | Shah | 285/81 X |
| 4,552,427 | 11/1985 | Landgreen | 285/87 X |
| 4,617,118 | 10/1986 | Smart | 285/81 X |
| 4,655,482 | 4/1987 | Myers et al. | 285/81 |
| 4,877,271 | 10/1989 | McCorkle et al. . | |
| 4,940,260 | 7/1990 | Uriarte Odriozola | 285/92 X |
| 5,048,872 | 9/1991 | Gehring | 285/92 |
| 5,083,819 | 1/1992 | Bynum | 411/121 X |
| 5,094,491 | 3/1992 | Berghammer et al. | 285/92 |

FOREIGN PATENT DOCUMENTS

| | | | |
|---|---|---|---|
| 534199 | 9/1931 | Fed. Rep. of Germany | 285/87 |

*Primary Examiner*—Dave W. Arola
*Assistant Examiner*—Heather Chun
*Attorney, Agent, or Firm*—Price, Gess & Ubell

[57] ABSTRACT

A locking assembly for fastening two components together, such as a fluid coupling assembly, is disclosed. A first member has a serrated annular surface and fastening threads adjacent a bearing surface. A second member has a flexible projection or projections or a complementary configuration to the serrated annular surface. The second member also includes fastening threads and a bearing surface. When the respective threads engage, they provide the primary preloading force to the bearing surface, while simultaneously the projections and the serrated detects provide a retention force to ensure a positive coupling.

13 Claims, 8 Drawing Sheets

COUPLING JOINT ASSEMBLY WITH INTEGRAL RETENTION MECHANISM

BACKGROUND OF THE INVENTION

1. Field of the Invention

The present invention is broadly directed to a locking assembly for fastening two components together and, more particularly, to an improved fluid coupling assembly for providing a compression sealed joint that can maintain its preload characteristics.

2. Description of Related Art

Numerous apparatuses have been utilized to retain the mechanical coupling of two component parts during use. As is well known, application of stress, vibration, and movement to a structure can frequently cause a loosening and release of a desired seating torque between a pair of components. A traditional method of attaching two component parts is to provide respective threads in a nut and bolt arrangement, and to preload or torque the components to a desired compression. Numerous methods have been suggested to inhibit the subsequent loosening of such a structure. Thus, lock washers, serrated surfaces, interference thread fitting, tapered threading surfaces for providing interference, nut plates, and lock wiring have been used. Adhesive materials have also been used as thread sealers to lock the two components together.

A particular problem can occur in pneumatic and hydraulic connectors that may not only be subjected to external vibrations and stresses, but also pressure stresses from the fluid that is being conducted through the sealed joint. In the aircraft industry, a substantial number of fluid coupling joints consist of compression fittings that are secured together by a nut which is subsequently lock wired to a mating coupling component in such a manner that the nut cannot turn with respect to the fitting to ensure against any loss of fluid tightness in the sealing joint. Fluid coupling joints are frequently located in areas where vision can be obscured, and the assembling of the joints must be made out of the direct vision of the worker. In such events, lock wiring is an unsatisfactory means of securing the joint against subsequent loosening. As can also be appreciated, inspection of the joint to ensure its integrity is often compromised.

An example of a lock wire fluid coupling can be found in U.S. Pat. No. 3,702,707. An alternative hydraulic connector can be seen in U.S. Pat. No. 4,877,271, wherein a lock ring can be engaged by a friction fit between the two component parts to secure the coupling.

There is still a need in the fastening arts to provide a coupling system having a retention mechanism that is activated by the same movement for creating the compression seal between the parts and does not require a secondary activity to effectuate the safety joining and retention of the component parts. Additionally, there is a further need to enable a verification of an effective operation of the retention mechanism independent of visual observation.

SUMMARY OF THE INVENTION

The present invention is directed to a locking assembly for fastening two components together. One of the components includes a serrated annular surface. The other component has a flexible projection of a complementary configuration to the serrated annular surface. The projection has such an inclination or disposition relative to the serrated surface to permit a camming rotation in a first direction, but will create a locking engagement in a second direction. The two components joined together can be fluid conduits, and the coupling assembly can be connected to the respective ends of a pair of fluid conduits to create a sealed joint.

A first component can be adapted for connection to a first fluid conduit and can provide a first sealing surface with a series of detents on its outer surface. The first member can have an approximately cylindrical configuration. The series of detents can, for example, be teeth or serrations having a camming face on one side of each tooth and a locking face on the other side of the tooth.

The second component member is also connected to a second fluid conduit and provides a second sealing surface. The second member can be hollow to provide an axial fluid conduit with the second sealing surface interior to the second component. The first component can form a male projection with helical threads to be rotated within the hollow opening of the second component member that has interior complementary helical threads for providing fastening between the two component parts. When fastened, a predetermined torque or compression preload between the respective sealing surfaces is created. The second member can have a plurality of load bearing exterior facets to assist in the application of a tightening force to be applied, and can further position a projection or a pair of projections to extend internally for operative contact with the annular detents on the first component member.

In operation, the second component member is mounted over a compression tube having a conical bearing surface. The second component member can relatively rotate about the compression tube, while the other end of the compression tube is securely fastened to a fluid conduit. The male member is then inserted into the female opening of the second component member to initially engage the respective threads. The rotation of the second component member starts the sealing engagement. Only after the threads are preliminarily engaged does the projection on the second component member come into contact with the series of detents. This creates both a vibrating tactile and an audible indicator for determining that a locking coaction is being engaged in completing the sealing joint. The number of detents and the position of the projection or projections are sufficient to enable the application of the desired preload between the sealing surfaces or torque load required for seating, while still ensuring a retention action between the projection or projections and the detents.

BRIEF DESCRIPTION OF THE DRAWINGS

The objects and features of the present invention, which are believed to be novel, are set forth with particularity in the appended claims. The present invention, both as to its organization and manner of operation, together with further objects and advantages thereof, may best be understood by reference to the following description, taken in connection with the accompanying drawings.

DESCRIPTION OF THE PREFERRED EMBODIMENTS

The following description is provided to enable any person skilled in the coupling industry to make and use the invention and sets forth the best modes contemplated by the inventor of carrying out his invention. Various modifications, however, will remain readily apparent to those skilled in this field, since the generic principles of the present invention have been defined herein specifically to provide a relatively easily manufactured locking assembly for fastening two components together, such as a fluid coupling.

Figure 1:
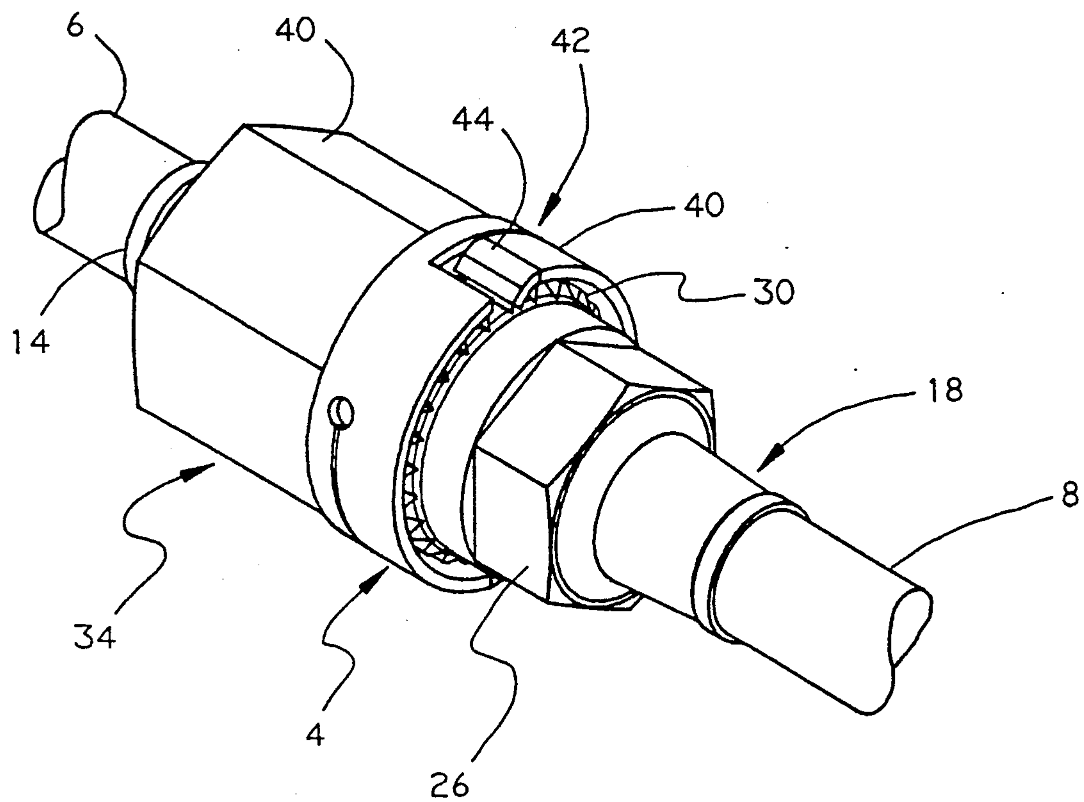
FIG. 1 is a perspective view of a coupling assembly in a first embodiment of the present invention.
Figure 2:
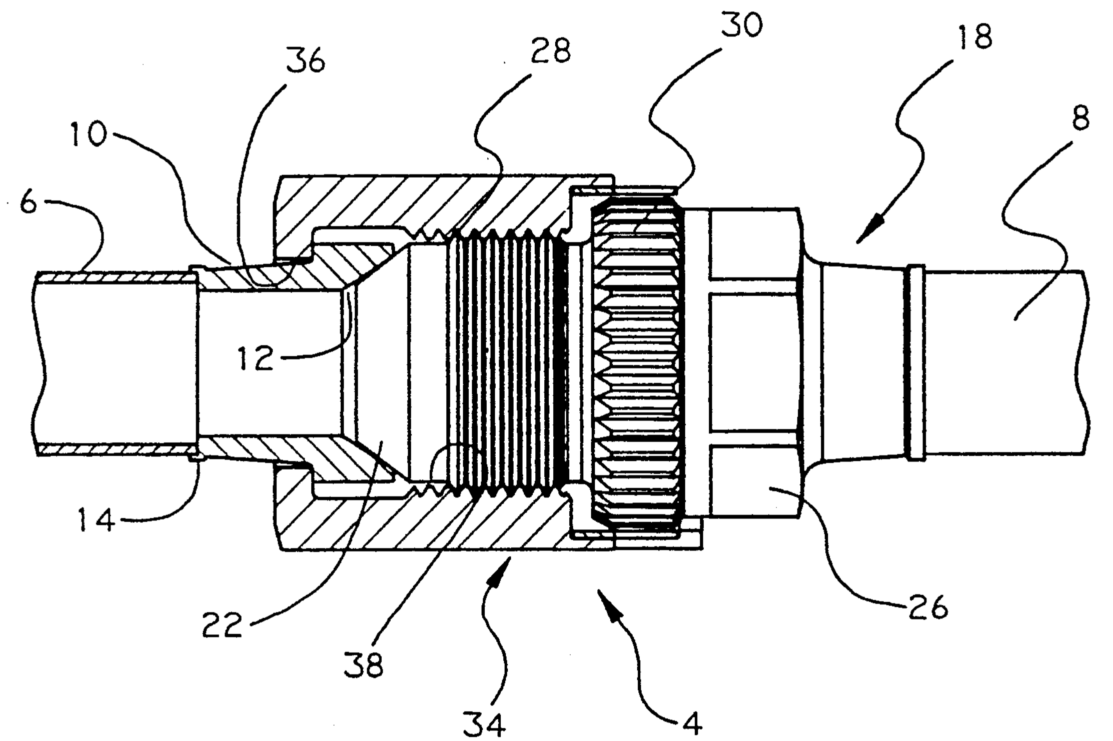
FIG. 2 is a partial cross-sectional view of the coupling assembly of FIG. 1.

Referring to FIG. 1, a fluidic coupling assembly 2 of a first embodiment of the present invention is disclosed incorporating a locking assembly 4. A first fluid conduit 6 is joined to a second fluid conduit 8 by the coupling assembly 2. As seen in FIG. 2, the fluid conduit 6 is connected directly to a compression tube 10 having a conical bearing surface 12 at one end and a flange 14 at the other. The flange 14 is mounted to the fluid conduit 6 and can be secured by any appropriate retention device such as a lock ring, worm screw, tight metallic belt, etc. In a preferred embodiment, the conduit 6 is welded to the flange 14. A first coupling member 18 has an approximately cylindrical configuration with a hollow interior axial fluid conduit 20. One end of the fluid conduit 20 terminates in a conical bearing surface 22, while the other end terminates in a flange 24. The fluid conduit 8 can be inserted within the flange 24 retained by welding.

Adjacent the bearing surface 22 is a helical thread fastener 28 that terminates adjacent an annular series of serrations or detents 30. The spacing of the detents 30 along the axial length of the first coupling member 18 is specifically designed to ensure an initial engagement of the helical thread fastener 28 before the detents 30 are engaged. A polygonal set of planar facets 26 can be used to provide a surface for engagement with a wrench, etc.

A hollow second component member 34 of the coupling assembly 2 is rotatably mounted around the compression tube 10, which extends through an axial opening 36. The female aperture which extends within the second component 34 has a threaded receptacle 38 of a complementary thread design to receive the fastener threads 28 of the first coupling member 18.

The exterior surface includes a plurality of planar facets 40 of a polygonal shape that can receive a wrench or jaws of pliers for applying additional torquing forces. A collar member 42 forms a portion of the locking assembly 4 for engaging with the serrated detents 30 on the first coupling member 18.

Figure 3:
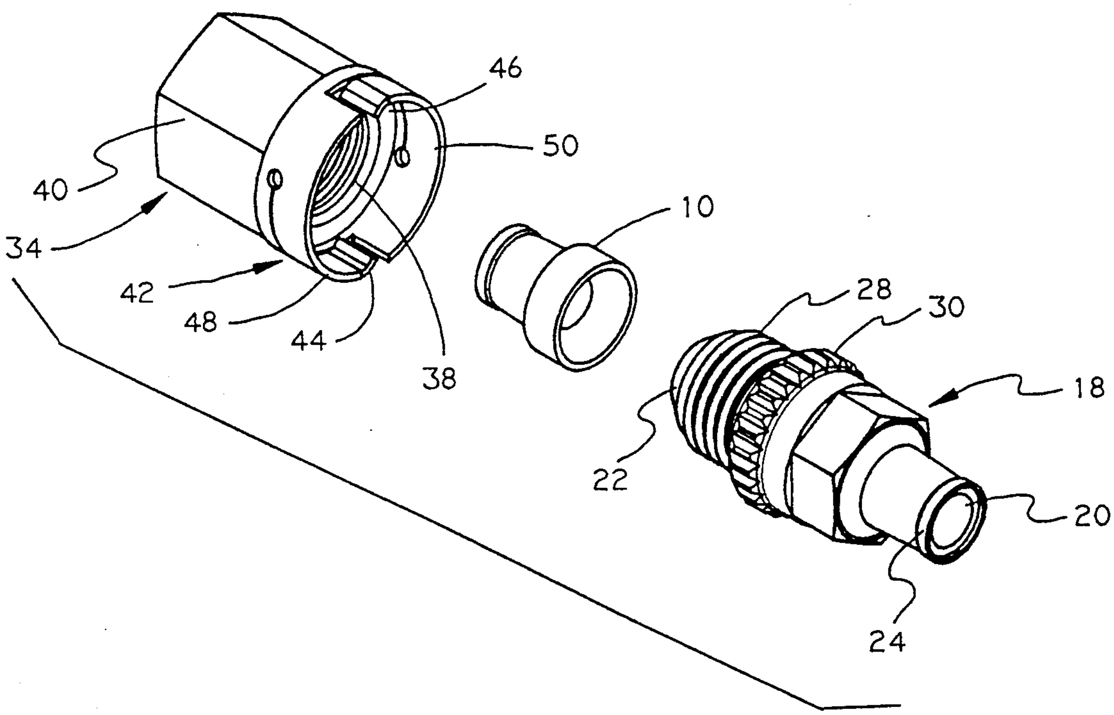
FIG. 3 is an exploded perspective view of the first embodiment of the present invention.

In the first embodiment, the collar member 42 is integral with the planar facets 40 and supports an inwardly-projecting pair of projections 44, 46 that are diametrically opposed, as shown in FIG. 3. These projections are respectively supported by cantilevers 48, 50 that are integrally formed with the collar member 42. The positions of these projections relative to the threaded receptacles 38 are specifically designed to ensure that they will not engage with the detents 30 on the first coupling member 18 until the helical thread fasteners 28, 38 have positively engaged.

Depending upon the accuracy and forces to be handled by the coupling assembly, each of the structural members can be formed from plastic, stainless steel, or other materials suitable and known within the coupling art.

A compression tube 10 can be inserted within the female aperture of the second coupling member 34, and then the first fluid conduit 6 can be welded onto the flange 14 of the compression tube 10. Likewise, the flange 24 of the first coupling member 18 can be welded to one end of the second fluid conduit 8.

The design of the present invention also permits a hand assembling of the coupling assembly 2. The male coupling member 18 is inserted within the female receptacle of the second coupling member 34. The coupling member 34 is then rotated to engage the respective fastener threads 28, 38. After these threads have been positively engaged and the first coupling member 18 is axially drawn into the second coupling member 34, the projections 44, 46 on the collar member 42 begin to engage the series of detents 30. These serrated detents are aligned parallel to the longitudinal axis of the coupling assembly and can comprise a triangular cross-sectional configuration, or even a sawtooth or serrated configuration, as will be subsequently disclosed in schematic figures. Since each of the respective projections 44, 46 are cantilevered and are resiliently biased against the detents 30, they provide a flexing action analogous to a spring loaded pawl to normally engage the serration and to provide a minor amount of resistance to a sealing rotation of the screw-like second coupling member 18. The inner engagement of the projections and detents creates both a tactile vibration that can be felt by the operator and an audio ratchet sounding interface that can be heard by the operator, so that he or she is assured that a positive sealing and locking action is occurring without even seeing the coupling assembly. The sealed joint occurs when the respective bearing surfaces 12, 22 are preloaded or pretorqued to the desired level.

At this point, any reverse rotation will cause the respective pawls or projections 44, 46 to enter into a locking engagement with the reverse tooth surfaces of the respective detents 30. As can be readily appreciated, there are no secondary actions required by the operator to ensure a positive retention feature for the operative coupling assembly. The retention feature is integrated directly with the primary sealing rotation of the screw-like second coupling member. Thus, the necessity of positioning additional lock rings or lock wires has been eliminated, and an important safety feature is established that can help minimize human error. Depending upon the specific use of the coupling assembly, the locking assembly can be designed to permit the pawls to be manually and radially lifted for disengagement of the coupling assembly 2, or the detent locking surfaces can be designed to be inclined at such an angle to the pawl members to permit a reverse ratcheting action at a higher force level.

Alternatively, the locking assembly could be designed to be permanently installed, and to be removed only upon destruction of the projections. These design options are available and will depend upon the particular choice of material, thickness of the collar configuration, application, etc.

As can be readily appreciated, the coupling assembly and locking assembly of the present invention is highly advantageous in making fluidic and hydraulic connections where safety is of a prime interest. The coupling assembly, however, is readily adaptable for ensuring connections, for example, of an electrical connector, or even of a fiberoptic connection.

Figure 4:
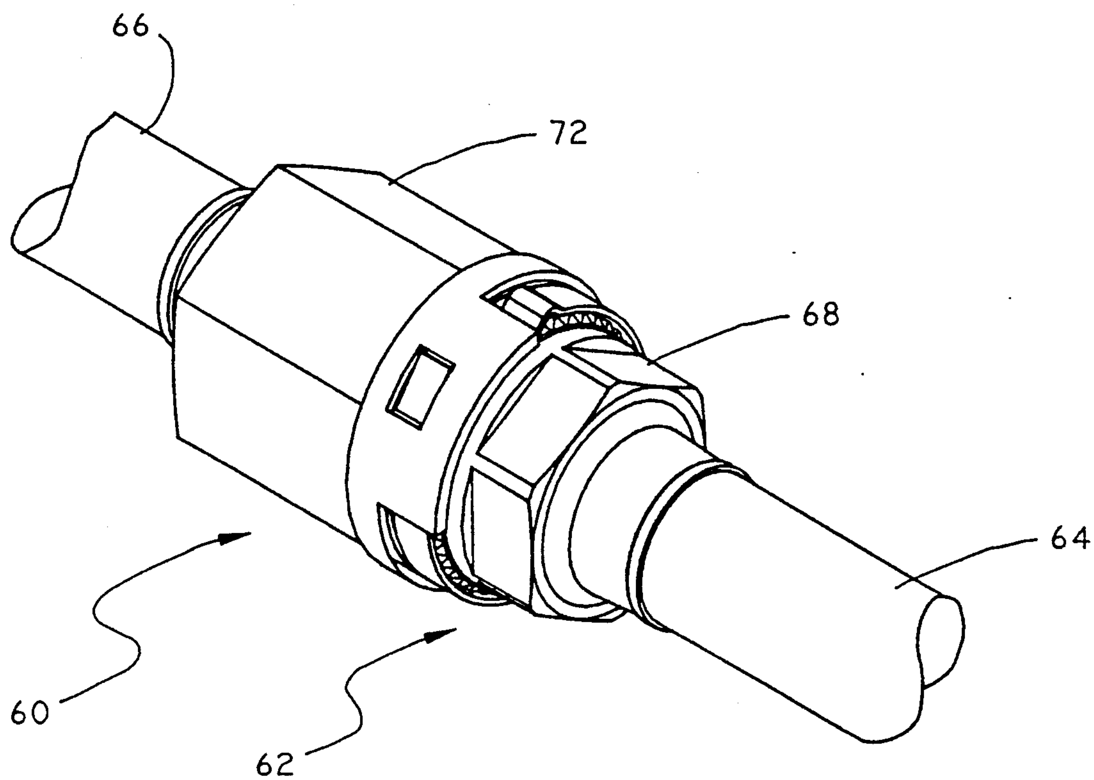
FIG. 4 is a perspective view of a second embodiment of the present invention.
Figure 5:
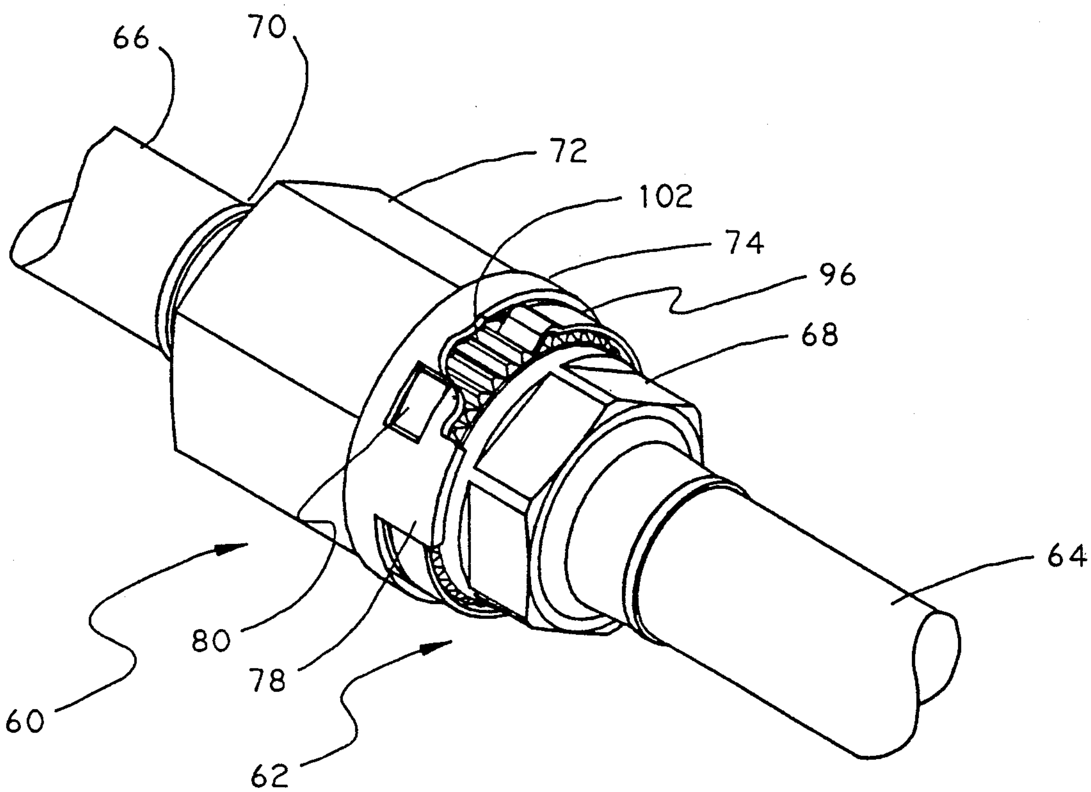
FIG. 5 is a partial cross-sectional view of the coupling assembly of the second embodiment of the present invention.
Figure 6:
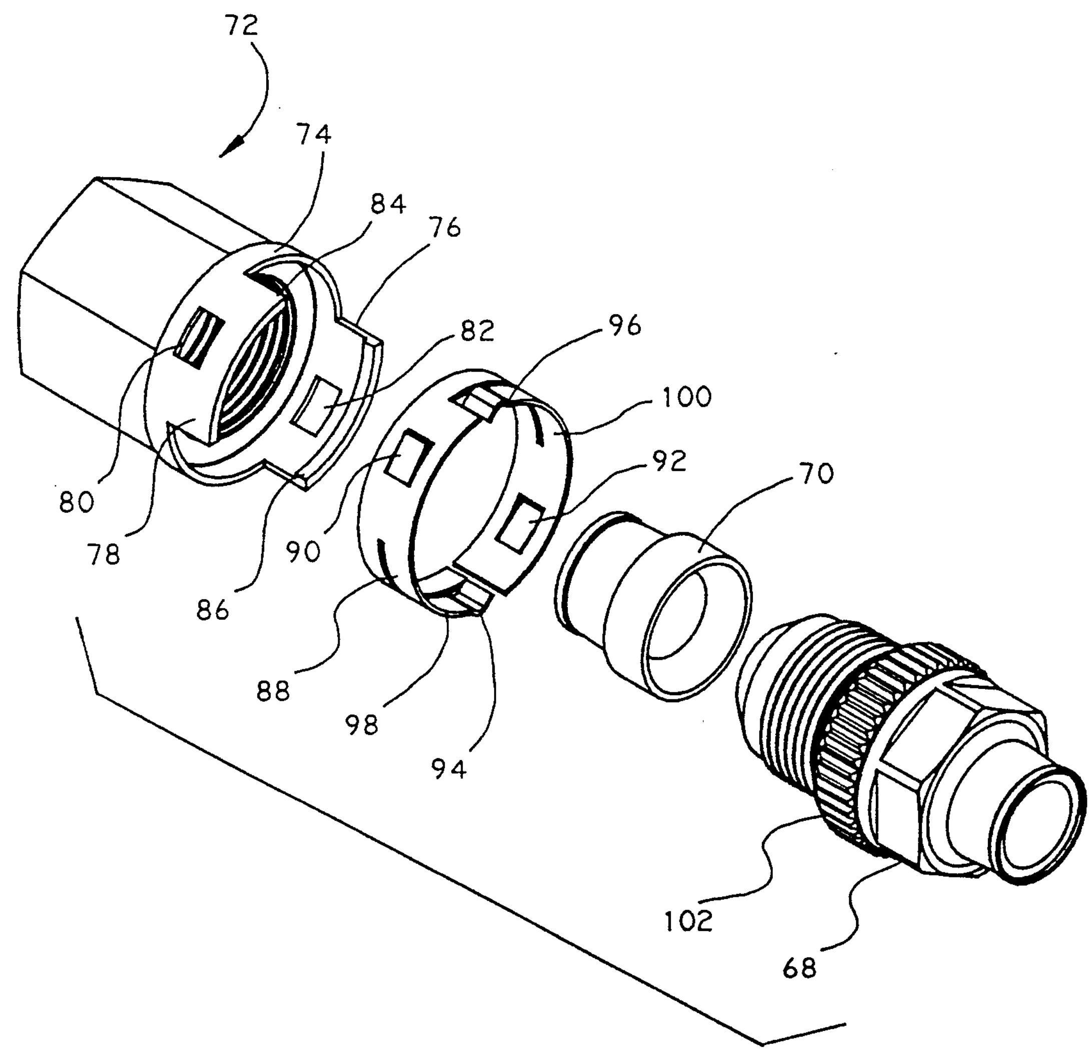
FIG. 6 is an exploded perspective view of the second embodiment.

FIGS. 4 through 6 disclose a second preferred embodiment of the present invention that is particularly designed to accommodate larger-sized conduits, wherein an integral collar member for supporting the cantilevered arms may be too stiff for hand coupling by an operator or, in the event of damage, the collar member can be replaced.

With reference to FIG. 4, a fluidic coupling assembly 60 includes a three-part locking assembly 62. A first fluid conduit 64, or other form of connector such as electrical, optical, etc., is joined to a second conduit 66 of a complementary nature by the coupling assembly 60.

Referring to FIG. 6, a first coupling member 68 is similar in configuration to that of the first coupling member 18 of the first embodiment and, accordingly, will not be further described. Additionally, a compression tube 70 is likewise similar to the compression tube 10 of the first embodiment and performs the same function. Basically, the difference between the first coupling member 68 and the compression tube 70 is that they are of a larger configuration. A second coupling member 72 has a collar member 74 including a pair of projections 76, 78 extending along the longitudinal axis. These respective projections have apertures 80, 82 diametrically positioned and respective retaining flanges 84, 86.

An annular spring retention member 88 is of a configuration complementary to dimensions of the flange 74. The spring member 88 can be inserted within the projections 76, 78 to be held in position by the retaining flanges 84, 86. Locking members or tabs 90, 92 are dimensioned to extend within the respective apertures 80, 82 for retaining the spring member 88 in a nonrotational engagement within the flange 74.

The spring retention member 88 has a pair of diametrically positioned projections 94, 96 that are respectively supported by cantilevered arms 98, 100.

In this embodiment of the invention, the relative locking forces established between the projections 94, 96 against the serrated detents or teeth 102 on the coupling member 68 can be varied without altering the configuration of the second coupling member 72. Thus, the spring member 88 can be replaced with thinner or thicker spring members to vary the forces applied against the serrated teeth, as shown on FIG. 5. Additionally, by loosening the respective locking members 90, 92, the spring member 88 can be removed from the flange 74 of the coupling member 72. This arrangement is of particular advantage on relatively larger conduits that are not as susceptible to providing an integral flange or collar member with spring cantilevered locking arms, as disclosed in the first preferred embodiment.

The operation of the coupling assembly of the second embodiment, however, is similar to that of the first embodiment. The screw-like coupling member 68 is inserted to engage the threads in the female coupling member 72. Subsequently, the respective spring member projections 94, 96 will contact the serrated teeth 102. As the respective projections 94, 96 flex their respective cantilevered arms, the projections will slide across the camming surfaces of the serrated teeth 102 as the first coupling member 68 is screwed into the second coupling member 72. The operator can feel this engagement and can hear the audio ratchet sound that it makes during the engagement. The arrangement of the locking members 90, 92 are to prevent any disengagement of the projections 94, 96 that would unseat the seal between the compression tube 70 and the bearing surface on the coupling member 68.

Figure 7:
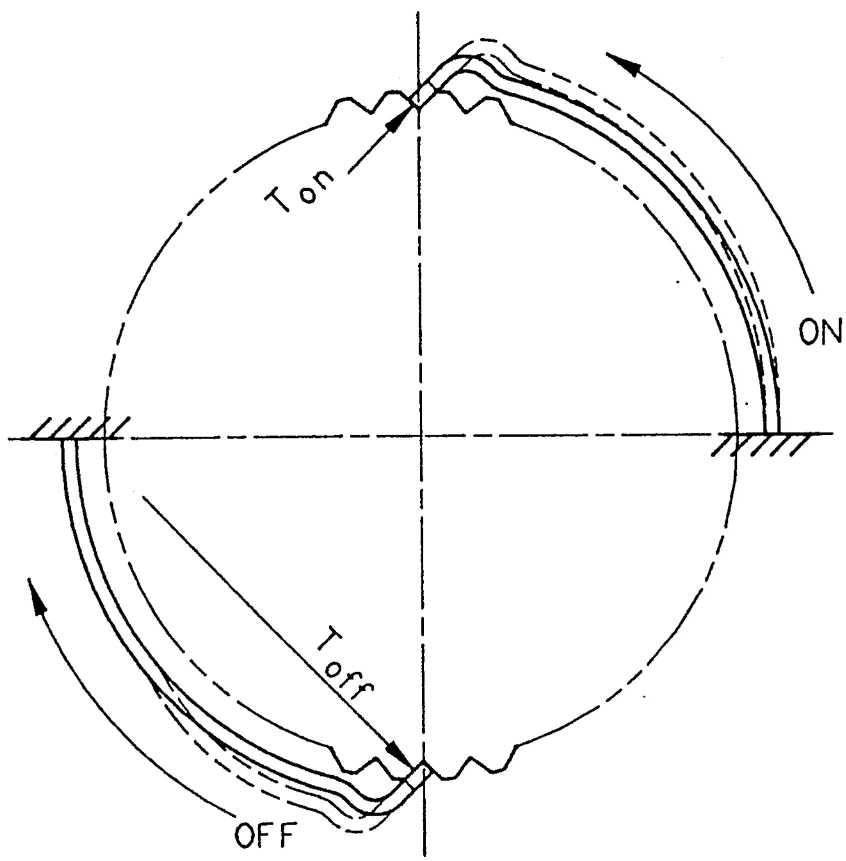
FIG. 7 is the schematic view disclosing the assembling and disassembling loads.

Referring to FIG. 7, a torque force diagram is schematically shown to disclose that only a force needed to flex a cantilevered arm and projections of the spring members radially outward enough to pass the tooth is necessary during a sealing engagement. This feature provides a designed resistance to the assembling of the coupling assembly. However, when the coupling assembly is subject to a rotation in a counter direction, the end face of the projections will lock against the serrated teeth. Depending upon the spring force factor and the inclination of the teeth and projections, a significantly higher force will be necessary to rotate the coupling assembly in a disengagement movement, or even a destructive force will be necessary to release the projections from engagement with the serrated teeth.

Figure 8:
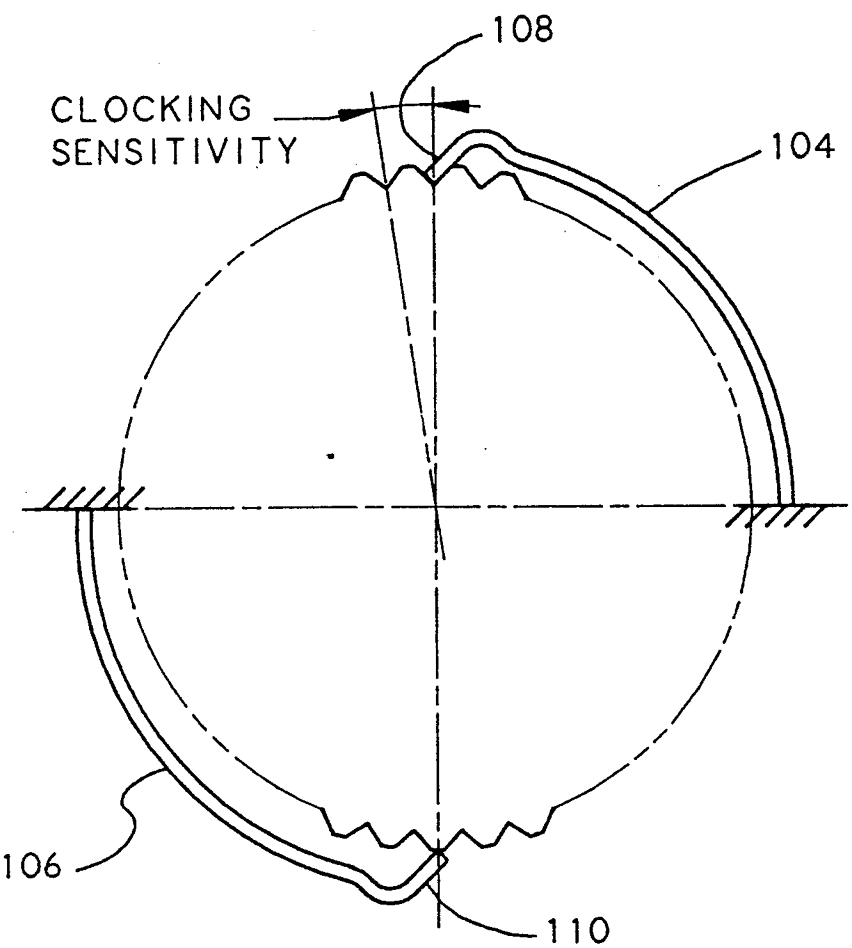
FIG. 8 is a schematic view disclosing an arrangement for increased precision mounting.

FIG. 8 discloses an alternative embodiment of the present invention to enable a finer positioning or clocking sensitivity to the retention mechanism, wherein the respective pawls 104, 106 are arranged, so that their respective teeth 108, 110 are only alternatively in engagement with a locking face of a serrated tooth. By this particular arrangement, the respective teeth 108, 110 will only have one of them in engagement at any one time with a serrated tooth detent. Thus, the rotational positioning of the coupling members can be finely controlled.

Those skilled in the art will appreciate that various adaptations and modifications of the just-described preferred embodiments are subject to numerous modifications and adaptations without departing from the scope and spirit of the invention. Therefore, it is to be understood that, within the scope of the appended claims, the invention may be practiced other than as specifically described herein.

What is claimed is:

1. An improved fluid coupling assembly for retaining a sealed joint, comprising:

a first member adapted to be connected to a first fluid conduit and having a first sealing surface and a series of teeth on its outer surface;

a second member adapted to be connected to a second fluid conduit and having a second sealing surface, wherein the first member is inserted into the second member, the second member including at least one relatively movable projection of a configuration to engage the series of teeth on the first member; the second member includes a collar at one end having a mounting aperture and an annular spring member is mounted to extend within the collar to engage the teeth of the first member, and the spring member supports the projection and resiliently biases it against the teeth, said projection curves radially inwardly to engage against the teeth;

first fastening means on the first member for securing the second member, and second fastening means on the second member for securing the first member, wherein interaction of the first and second fastening means operatively positions the first and second sealing surfaces the projection on the second member easily moving across the teeth during a sealing engagement but locking against a tooth to prohibit a disengaging movement of the respective fastening means.

2. The invention of claim 1 wherein the collar that extends about the series of teeth on the first member when the respective fastening means interact and a pair of projections is resiliently cantilevered from the collar.

3. The invention of claim 2 wherein the teeth have camming surfaces to depress the projections along the sealing engagement movement and locking surfaces to engage the projections along the disengagement movement.

4. The invention of claim 3 wherein the second member is hollow and includes a sleeve compression tube mounted within the second member to engage the first fluid conduit and to provide the second sealing surface.

5. The invention of claim 3 wherein the number of teeth is sufficiently large to enable an application of a predetermined seating preload to the respective sealing surfaces, while ensuring engagement between the teeth and the projections.

6. The invention of claim 3 wherein the projection and collar are integrally formed.

7. The invention of claim 6 wherein a pair of diametrically opposed projections is provided on the collar.

8. The invention of claim 1 wherein the spring member provides a pair of integral diametrically opposed projections.

9. A locking assembly for fastening two components together, comprising:

a first member having a serrated annular surface connected to a first component, and a second member having a flexible projection with a surface of a complementary configuration to the serrated annular surface, wherein the first member is inserted into the second member, wherein the projection's angle of interface with the serrated annular surface and the relative angle of inclination of the serrated annular surface permits a camming rotation in a first axial direction but creates a locking engagement in a second axial direction, the second member includes an annular collar with a retention spring mounted within the annular collar having the projection extending inward from the spring, said projection curves radially inwardly to engage against the teeth.

10. The invention of claim 9 wherein the first member has a series of detents forming the serrated annular surface.

11. The invention of claim 9 wherein the retention spring is an annular member with a pair of cantilevered projections extending inward from the spring.

12. An improved fluid coupling assembly for retaining a sealed joint, comprising:

a first member adapted to be connected to a first fluid conduit and having a first sealing surface and a series of detents on its outer surface, the first member being approximately cylindrical in body shape with an axial fluid conduit extending therethrough and terminating at the first sealing surface, the first member having helical threads positioned about its body adjacent the series of detents, and a second member adapted to be connected to a second fluid conduit and having a second sealing surface, wherein the first member is inserted into the second member, the second member including at least one relatively movable projection of a configuration engaging the series of detents on the first member, the second member being hollow with a fluid conduit and having a series of exterior facets at one end and a collar at the other end, the collar forms an approximately annular channel on its inside surface and a resilient spring member is mounted within the channel to provide the projection, said projection curves radially inwardly to engage against the teeth, the second member having helical threads complementary in configuration to the threads of the first member within its hollow portion, interconnection of the respective threads enabling a sealing preload force to be created between the respective sealing surfaces as the projection moves across each detent, the configuration of each detent providing a camming motion to the projection during a sealing engagement and a locking interaction during any disengagement, whereby the sealed joint is established by engagement of the first and second member's helical threads and maintained by the interaction of the projection and a detent.

13. The invention of claim 12 wherein a pair of integral diametrically opposed projections is provided on an annular resilient spring member.

* * * * *